Nov. 9, 1965  D. J. KLEIBER  3,217,078
PROCESS FOR MOLDING HOLLOW ARTICLES FROM
THERMOPLASTIC MATERIALS
Filed April 16, 1962  2 Sheets-Sheet 1
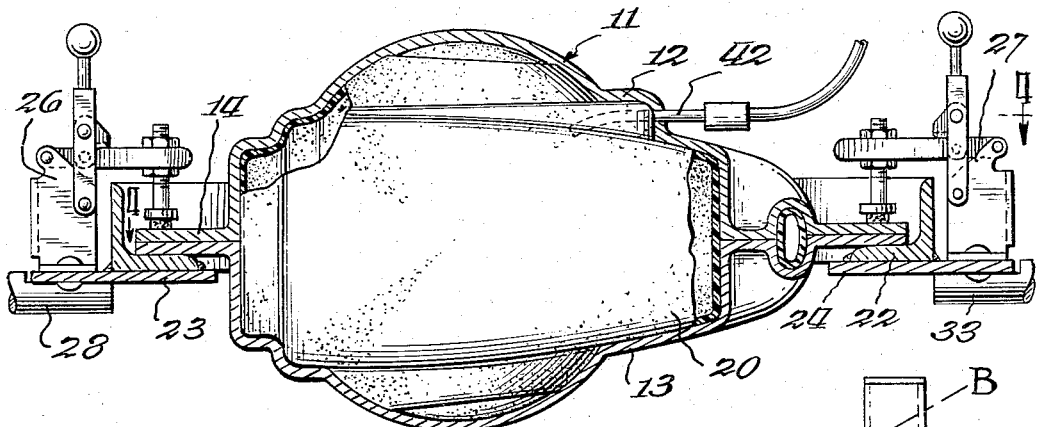
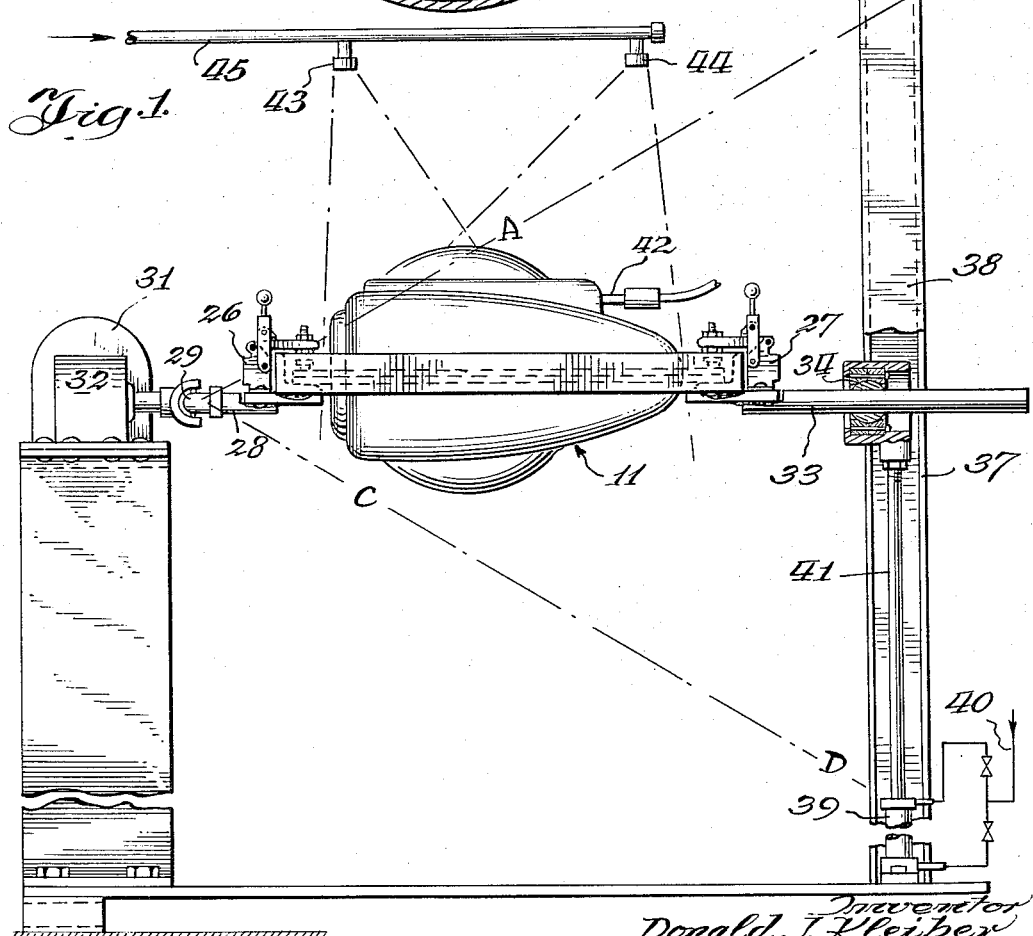
Inventor
Donald J. Kleiber
By Meriam, Smith & Marshall
Attorneys

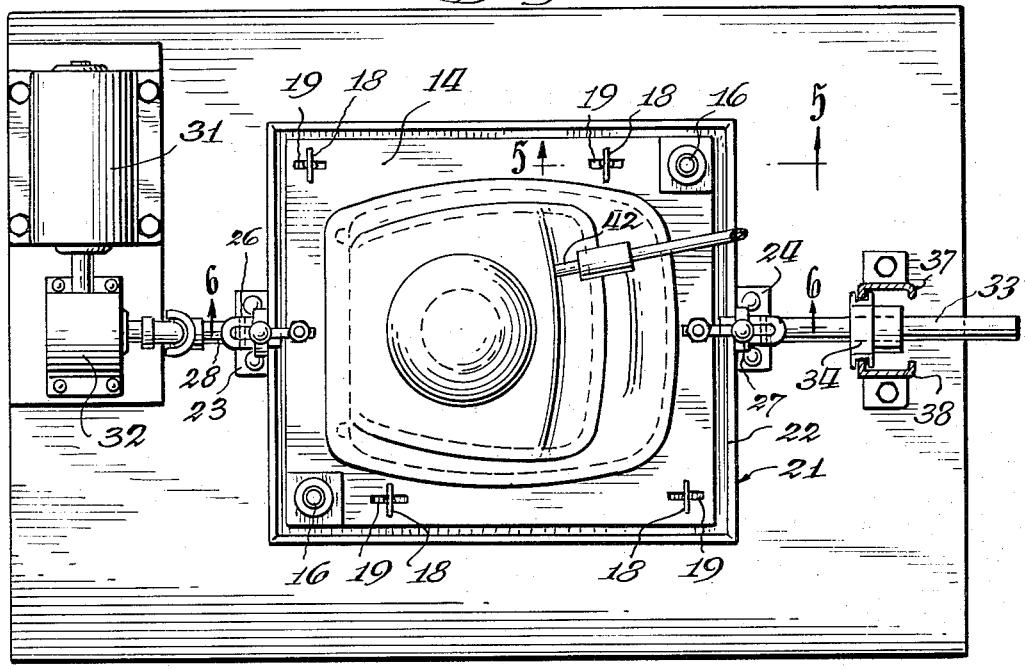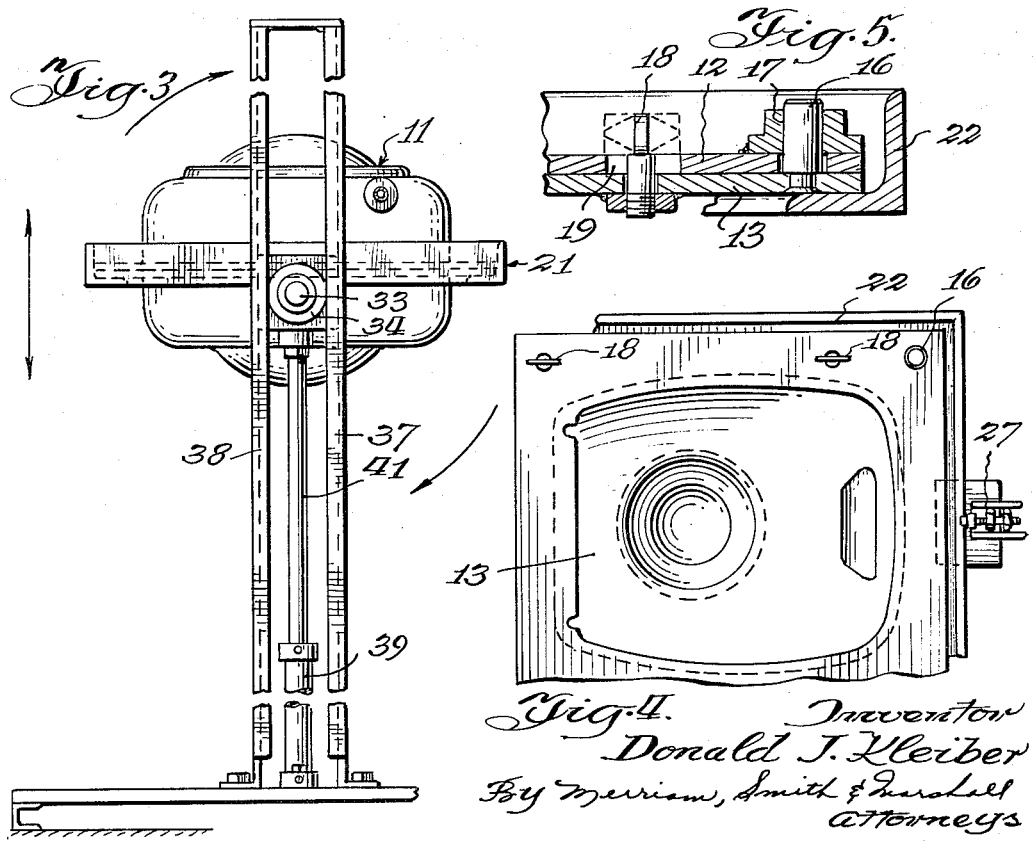

United States Patent Office 3,217,078
Patented Nov. 9, 1965

3,217,078
PROCESS FOR MOLDING HOLLOW ARTICLES FROM THERMOPLASTIC MATERIALS
Donald J. Kleiber, Norridge, Ill., assignor to C/R Custom Plastics Corp., Chicago, Ill., a corporation of Illinois
Filed Apr. 16, 1962, Ser. No. 187,855
3 Claims. (Cl. 264—310)

This invention relates to a process for molding hollow articles from finely divided thermoplastic materials. More particularly, it relates to a process which can be used to mold relatively thick-walled, self-supporting, substantially closed hollow articles using finely divided plastic matrials, such as polyethylene.

There are presently known to the art several methods for forming hollow articles from thermoplastic materials, among which are injection molding, vacuum forming, and blow molding, and the like. Each of these, however, has a number of disadvantages. Thus, for example, injection molding requires large, complicated and expensive equipment. In addition, if the object to be molded is of large size the pressure required may reach a very high value which has a tendency to separate the sections of the mold, thereby producing flashing which must be removed after the molding operation is completed. Vacuum forming, in which a heated sheet of plastic is drawn against the face of a suitable die by means of a vacuum between the plastic and the die, likewise produces excessive waste and subsequent distortion resulting from the plastic memory of the plastic. In addition, the non-uniform stretching of the plastic sheet results in a non-uniform wall thickness which represents an economic waste of plastic material, since the original sheet must be made thicker than necessary in order to insure that a certain maimimum wall thickness is obtained in the finished article. A further disadvantage of injection molding and vacuum forming is that hollow articles produced by these methods must be in the form of two separate shells bonded together in a subsequent operation. Blow molding, which is closely related to vacuum forming except that a positive pressure is used instead of vacuum to force a heated plastic sheet or film against the die, likewise results in non-uniform wall thickness and excessive flash material.

There are also known plastic molding methods in which a finely divided plastic material is used in conjunction with a heated mold to form a thin liner having the desired shape. Such processes are described in U.S. Patents Nos. 2,736,925 and 2,864,128, issued to J. S. Heisler et al., on March 6, 1956, and December 16, 1958, respectively, and Engel Patent 2,915,788, issued December 8, 1959.

The Heisler patents relate to a process for molding hollow articles from polyethylene in which a heated mold having the shape of the desired article is heated to a temperature sufficient to cause softening or incipient fusion of polyethylene coming in contact therewith. Finely divided polyethylene is applied onto the heated surface under the influence of a wiping force, which may be either directly applied by a mechanical agency or that which results from the weight created by filling the entire mold with polyethylene. In the latter case, the excess polyethylene is gradually withdrawn from the heated mold, leaving within the mold a thin layer of partly fused polyethylene powder which is then subjected to a further heating operation to produce complete fusion and the formation of a uniform thin layer on the wall of the mold. If a self-supporting, relatively thick-walled article is desired the process is repeated as often as necessary, building up the thickness of the wall by a slight amount during each cycle. Because of the necessity for applying a wiping force to the polyethylene particles to insure firm contact with the heated wall of the mold, hollow articles which are substantially entirely closed, such as carboys, cannot be made in one step. Instead the walls and bottom are made as one unit while the top is made as a separate unit and the units are joined together to produce the substantially closed container.

The Engel process relates to a method for forming relatively deep plastic articles from a finely divided thermoplastic material, such as polyethylene, in which a heated mold is filled with an excess of polyethylene finely divided which is allowed to coalesce to the desired thickness in the proximity of the mold surface. The excess powder is then withdrawn, leaving a grainy interior surface on the polyethylene layer. The article is then subjected to a heating operation, if it is desired to smooth out the inner surface of the molded article. The Engel process likewise cannot be used for the production of substantially closed articles because of the fact that during the operation the excess thermoplastic material must be withdrawn from the interior of the molded article.

In accordance with the instant invention, there is provided a method for molding hollow articles which eliminates many of the disadvantages both of the known methods of molding, such as injection molding, vacuum forming, etc., as well as of the known powder forming methods. In my process there is employed a heated mold made of two or more complementary sections which substantially entirely enclose a molding cavity. This mold is heated to a temperature above the melting point of the thermoplastic material, typically polyethylene, which is used, so that when the thermoplastic material is charged to the interior of the mold, it will entirely fuse. In my process the exact quantity of thermoplastic material required to form the article is charged to the mold, while the absence of pressure insures that no flashing occurs at the joints. In addition, a relatively thick-walled, self-supporting article can be made in one cycle, thus eliminating the repetition of cycles necessary to produce such an article by the Heisler process. Further, the article produced by my method has a smooth interior surface which does not require subsequent heating, as in the Engel process. In addition, substantially completely enclosed articles having only a vent hole can be made in one step from my process, as opposed to both the Heisler and Engel processes in which the requirement for removing excess molding powder prevents the formation of a closed article in one step.

My invention will be better understood from the following detailed description thereof taken in conjunction with the accompanying drawings, in which:

FIG. 1 is a side view of apparatus suitable for carrying out the process of the invention, showing a typical mold in a frame which permits tumbling;

FIG. 2 is a top view of the apparatus of FIG. 1;

FIG. 3 is a view of the right side of the apparatus shown in FIG. 1;

FIG. 4 is a sectional view through the mold of FIG. 6, taken along the line 4—4;

FIG. 5 is a partial sectional view along the line 5—5 of FIG. 2, showing the means for aligning and locking the sections of the mold; and FIG. 6 is a partial sectional view along the line 6—6 of FIG. 2 showing a molded object in place within the mold with a portion of the molded wall broken away to show the thickness thereof.

There is depicted in the drawings suitable apparatus for carrying out the method of the invention. The apparatus comprises a mold 11 which is formed of two complementary halves 12 and 13 which when assembled define a hollow molding zone. As shown, particularly in FIG. 6, each half of the mold contains a flat portion, e.g., 14, surrounding the molding cavity. Proper positioning of the halves of the assembled mold with the flat peripheral portions in contact is achieved by means of pins 16 which are rigidly connected to the lower mold section 13 and pass through suitably spaced openings 17 in upper mold half 12. After mold halves 12 and 13 are assembled they are locked in position by means of lock screws 18 which pass through appropriate holes 19 in mold half 12 and are given a quarter turn to draw the halves of the mold firmly together.

The assembled mold is held in frame 21, suitably formed of angle 22, of a size which supports the assembled mold around its periphery with the underhanging portion of the mold passing through the opening of the frame. Extension plates 23 and 24 are rigidly attached to frame 21 and carry thereon toggle clamps 26 and 27 which when actuated clamp the assembled mold firmly in position within the frame 21. Attached to one side of frame 21 is a short rod 28 connected to a universal joint 29 which in turn is activated by electric motor 31 through a variable speed gear drive 32. On the opposite side of frame 21 there is attached rod 33 which passes through bearing 34, which in turn is held in position by means of bearing guide 36 consisting of vertical members 37 and 38 which permit vertical movement of bearing 34. Bearing 34, which permits reciprocating motion of rod 33 held therein, is connected to air cylinder 39 by means of rod 41. Air cylinder 39 is connected to a source of compresed air through line 40 for extension and retraction of rod 41 as desired. This extension and contraction alternately raises and lowers bearing 34 within guide 36, thus causing the edge of the mold to oscillate through a total of about 60°, as indicated by dashed lines AB and CD in FIG. 1.

The walls of mold 11 are suitably formed of metal and have a thickness sufficient to store enough heat to cause complete fusion of the finely divided thermoplastic material charged into the mold. The actual thickness of the mold will of course vary with the heat capacity of the metal used as well as with the desired wall thickness in the molded object. Typical mold wall thicknesses range from less than 1/16" to more than 1/4". The method of forming this mold forms no part of this invention. Suitable methods including electroforming will be apparent to those skilled in the art.

The assembled mold is provided with a vent pipe 42 which communicates to the outside from the interior of the assembled mold 11. Vent pipe 42 is necessary to provide access of the atmosphere to the interior of the molded object in the mold, thus preventing collapse of the molded object which would otherwise occur on cooling if the interior of the molded object is hermetically sealed at an elevated temperature. The vent pipe is of course preferably placed in an inconspicuous portion of the molded object in order to avoid unnecessary marring of the object.

A typical molding cycle will be described in conjunction with the production of the article depicted in the drawings, which is a polyethylene bag 20 suitable for carrying a bowling ball and accessory equipment. At the start of the molding cycle the entire mold is preheated to a temperature of about 450–550° F. by any suitable means, such as an oven, in a manner which will be apparent to those skilled in the art and which forms no part of this invention. With the frame 21 in a horizontal position the lower mold half 13 is placed within the frame, and a quantity of finely divided polyethylene, in this case about 2 lbs., is poured into the open mold. The top half 12 of the mold is then put into position, toggle clamps 26 and 27 are actuated, clamping the mold firmly together in the frame and motor 31 is energized, thus causing the rotation of the mold, as shown by the arrows in FIG. 3. The mold is rotated at a speed of about 20 r.p.m. while air cylinder 39 is energized to cause the mold to move in a reciprocating vertical path while it is rotated.

Within the mold the finely powdered polyethylene tumbles under the influence of gravity and contacts all portions of the heated mold on which it fuses and collects as a molten layer. The rotation and reciprocating movement of the end of the mold insure that all portions are uniformly covered in this manner. The rotation of the mold is preferably periodically reversed in order to avoid thin spots which may otherwise tend to form in the molded walls.

While the mold is being tumbled in the manner described, it is permitted to cool in the ambient atmosphere. After a period of about 3–5 minutes the temperature has dropped to a point where the polyethylene has solidified into a layer of uniform thickness adjacent the mold walls. At this time water supplied through pipe 45 is sprayed through nozzles 43 and 44 to quickly cool the mold to a temperature of about 100–125° F. Alternatively, mold 11 may be cooled by being in a water dip tank containing water at about 150° F. The mold is then opened and the molded object is withdrawn therefrom.

Following the method of the invention, there can be produced, in one step, hollow, self-supporting molded articles having wall thicknesses ranging from 0.05 inch to 0.5 inch or more, as desired. Moreover, these molded articles can be substantially closed, as exemplified by bottles and carboys. There can also be made subsantially closed containers which can be cut into sections as desired after molding to produce objects such as luggage and carrying cases for typewriters, phonoraphs, and the like.

In the process of the invention, there can be used any thermoplastic material which has a relatively sharp melting point, as opposed to a softening range. This requirement follows from the fact that all of the plastic must melt completely within the heated mold in order to flow under the sole influence of gravity into all areas of the mold and thereby to produce the desired molded article. Typical examples of suitable thermoplastic materials include cellulosic, vinyl, nylon, polyethylene, and chlorinated polyether plastics, among which polyethylene is a particularly desirable material because of its mechanical strength, abrasion resistance, weatherability, adaptability to color, light weight, and relatively low cost.

The finely divided plastic used in the invention may range in size from below about 20 mesh to about 100 mesh, although the sizes from about 20 to 50 mesh are preferred. It has been found that the finer particles, those having mesh sizes of 100 and above, tend to accumulate non-uniformly on the walls of the mold, causing non-uniform wall thicknesses in the molded object as a result thereof. Particles below about 20 mesh are somewhat deficient in their ability to reproduce fine line detail in the mold when such is desired, and accordingly are not preferred for such applications. It has also been found advantageous to use material in which the individual particles are irregular in shape rather than spherical. The irregularly shaped particles appear to tumble more evenly within the mold and thus lead to a more uniform molded wall.

In order to facilitate removal of the molded object from the mold, it is desirable to use a release agent on the molding surface thereof. Such a mold release agent typically comprises a silicone liquid or grease which may be applied by spraying or wiping to the mold surface to prevent adherence of the thermoplastic material. It has also been found desirable to provide a baked-on silicone finish, known commercially as "pan-glazing," to the mold surface. This baked-on finish has release properties which permit a substantial reduction in the number of applications of silicone or grease which might otherwise be required.

In the specific embodiment of the invention depicted in the drawings, the heat used to fuse the thermoplastic powder into a uniform layer within the mold was supplied by the retained heat of the relatively thick walls with which the mold is provided. It will be obvious that such a thick-walled mold can be dispensed with by providing an extraneous source of heat to accomplish the same result. Thus, a relatively thin mold may be used which is heated by electric heaters, hot gases or hot liquids to achieve a sufficiently high temperature to fuse the powdered material in contact with the mold. The flow of heat from such sources could be regulated as desired so that heat would be interrupted at the end of the molding cycle while the mold is being cooled. Another modification of the apparatus could comprise cooling coils adjacent the mold walls for quick cooling of the mold after the thermoplastic material has entirely fused. Other suitable modifications of equipment will be apparent to those skilled in the art.

The temperature to which the mold is heated in the process of the invention is determined by the melting point of the plastic material, and to some extent by the fineness of the detail which is desired in the molded object. This temperature must be high enough to cause all of the plastic to fuse together into a uniform nonporous layer having a smooth inner surface, while avoiding temperatures so high that the plastic material decomposes. If the exterior surface of the molded object is to contain much fine detail, such as in the case of a surface simulating leather, the operating temperature of the mold is desirably elevated somewhat in order to increase the fluidity of the molten plastic adjacent the mold surface, thereby insuring that the fine details of the mold are accurately reproduced. In general, temperatures of about 300°–600° F. can be used advantageously in the process of the invention. With the preferred plastic, polyethylene, temperatures of 450°–550° F. will generally be satisfactory.

In some applications of the invention it has been found advantageous to incorporate with finely divided polyethylene a small amount, typically on the order of 1%, of a blowing agent, such as p,p'-oxybis(benzenesulfonyl hydrazide), as described in U.S. Patent 2,552,065. Such blowing agents are finely divided solids which decompose at elevated temperatures to produce small quantities of a gas, typically nitrogen, in order to achieve a porous, foamlike structure. The use of such a blowing agent produces molded articles having cellular rather than solid walls in the process of the invention, thereby permitting a reduction in the weight of the article for a given wall thickness or an increase in the wall thickness and thus an increase in rigidity for an article of given weight. In use, these blowing agents are merely intimiately mixed with the finely divided polyethylene which is then used in the conventional manner of the invention.

In certain instances it may be desired to produce a hollow article having a substantial opening within the same. This can be done in accordance with the invention by supplying a section of the closed mold which is made of an insulated material which is not heated. Accordingly, during the tumbling of the mold the thermoplastic material will not melt and stick to this section, so that the finished object will be provided with an opening corresponding in size and configuration to the insulated section of the mold.

The foregoing detailed description has been given for clearness of understanding only, and no unncessary limitations should be understood therefrom, as modifications will be obvious to those skilled in the art.

What is claimed is:

1. The method of molding a shaped, self-supporting, relatively thick-walled, hollow article from a finely divided thermoplastic material having a sharp melting point which comprises heating the complementary sections of a mold which when assembled enclose substantially completely a molding cavity having a surface corresponding to the outer surface of the article to be molded, assembling the sections of said mold enclosing therein an exact quantity of a finely divided solid thermoplastic material required to produce said article, the heating of said mold being carried out to a temperature above the melting point of said thermoplastic material to insure the complete fusion of all of said plastic material enclosed in said mold, tumbling said mold to cause said finely divided plastic to come into contact with the surface of said molding cavity under the sole influence of gravity, and to produce a uniform layer thereon, continuing the tumbling until all of said thermoplastic material has been fused together in a smooth, relatively thick, substantially uniform, nonporous layer adjacent the interior surface of said molding cavity, cooling said mold below the melting point of said plastic material to cause solidification thereof, and removing the shape retaining molded object from said mold.

2. The process of claim 1 wherein said thermoplastic material is polyethylene having a particle size of about 20–100 mesh.

3. The method of claim 1 wherein said thermoplastic material is polyethylene including a solid blowing agent in sufficient quantity to produce a cellular wall in the molded object.

References Cited by the Examiner

UNITED STATES PATENTS

| | | | |
|---|---|---|---|
| 2,736,925 | 3/56 | Heisler et al. | 18—58.3 |
| 2,888,714 | 6/59 | Bray | 18—58.3 |
| 2,914,436 | 11/59 | Nakielny | 154—43 |
| 2,948,665 | 8/60 | Rubens et al. | 18—485 |
| 2,958,907 | 11/60 | Mumford et al. | 18—58.3 |
| 2,990,306 | 6/61 | Dyer | 154—43 |
| 3,030,668 | 4/62 | Taylor | 18—58.3 |
| 3,052,927 | 9/62 | Hoppe et al. | 18—58.3 |

FOREIGN PATENTS

| | | |
|---|---|---|
| 712,939 | 8/54 | Great Britain. |
| 845,059 | 8/60 | Great Britain. |

OTHER REFERENCES

"Silicone Coating Replaces Grease in Baking," in Paint Manufacture, page 248, July 1947.

ROBERT F. WHITE, *Primary Examiner.*

MORRIS LIEBMAN, ALEXANDER H. BRODMERKEL, *Examiners.*